No. 683,862. Patented Oct. 1, 1901.
A. N. PETIT.
METHOD OF MAKING DUPLICATE SOUND RECORDS.
(Application filed Nov. 28, 1900.)
(No Model.) 2 Sheets—Sheet 1.
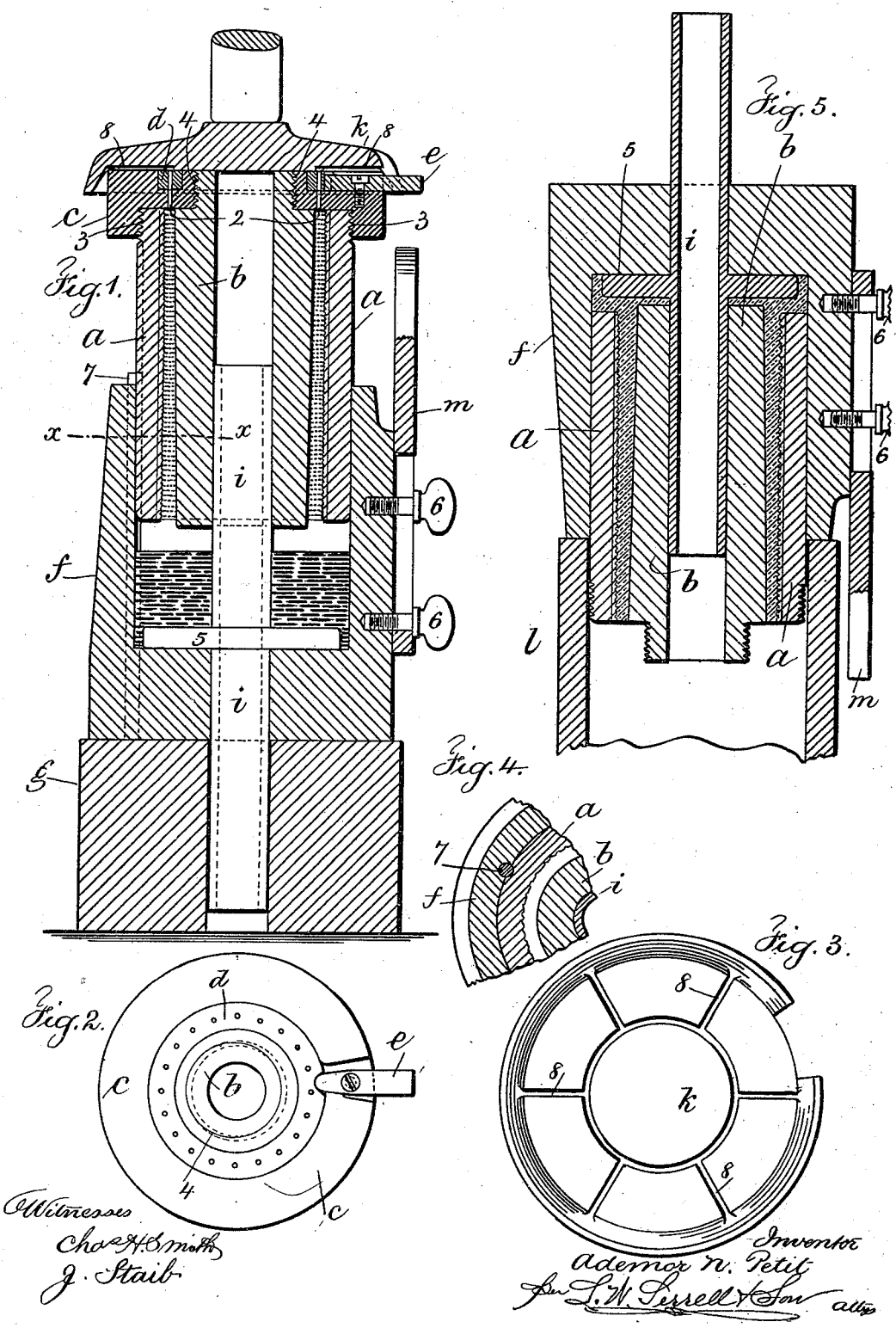

No. 683,862. Patented Oct. 1, 1901.
A. N. PETIT.
METHOD OF MAKING DUPLICATE SOUND RECORDS.
(Application filed Nov. 28, 1900.)
(No Model.) 2 Sheets—Sheet 2.

Witnesses
Chas H. Smith
J. Staub

Inventor
Ademor N. Petit.
per L. W. Serrell & Son
Atty.

THE NORRIS PETERS CO., PHOTO-LITHO., WASHINGTON, D. C.

UNITED STATES PATENT OFFICE.

ADEMOR N. PETIT, OF NEWARK, NEW JERSEY, ASSIGNOR TO HIMSELF AND ALBERT O. PETIT, OF SAME PLACE.

METHOD OF MAKING DUPLICATE SOUND-RECORDS.

SPECIFICATION forming part of Letters Patent No. 683,862, dated October 1, 1901.

Application filed November 28, 1900. Serial No. 37,992. (No specimens.)

*To all whom it may concern:*

Be it known that I, ADEMOR N. PETIT, a citizen of the United States, residing at Newark, in the county of Essex and State of New Jersey, have invented an Improvement in Methods of Making Duplicate Sound-Record Cylinders, of which the following is a specification.

Heretofore phonogram-blanks of wax composition have been cast and thereafter trued with heated tools and the record of sound afterward engraved or cut thereon and matrices of such sound-records have been formed and duplicate records made therefrom.

My invention relates to the method of making a duplicate sound-record cylinder; and in carrying out my invention I employ a matrix-body—that is to say, a matrix of a sound-record made and backed up in substantial shape in any manner well known in the art, a hollow-core device to which the same is removably connected, a perforated hollow base and a tubular center received within the core and base, and means for forcing the matrix and core down into the base and causing composition material rendered fluid by heat and held in said hollow base to flow upward between the matrix and core under pressure to fill the interstices of the matrix and when set, cooled, and removed to form the duplicate sound-record. I also provide means for the escape of the confined air and thereafter of a small quantity of the fluid composition to prove the absence of the air and which means are closed or shut off before final pressure is applied to consolidate the composition material in forming the duplicate record and compel the composition to fill all the delicate portions of the matrix. I also provide means for cooling the duplicate sound-record from inside and means for thereafter removing the core to liberate the duplicate record from the matrix.

Figure 6:
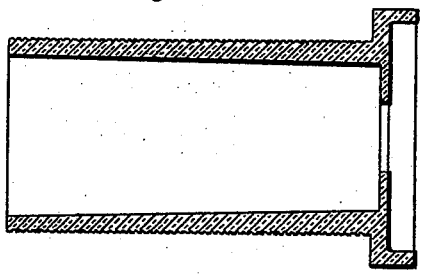
Figure 7:
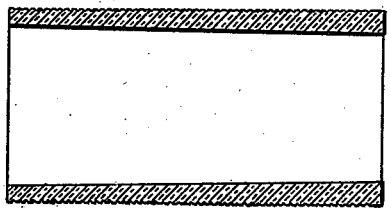

In the drawings, Figure 1 is a vertical section and partial elevation representing my improvement. Fig. 2 is a plan of the head portion connecting the matrix and the hollow core together with the devices connected thereto for permitting the escape of the air. Fig. 3 is an inverted plan of the pressure-cap of the press. Fig. 4 is a partial sectional plan at $x$ $x$ of Fig. 1, showing a guide-pin between the hollow base and the matrix to insure the vertical movement of the parts with reference to one another. Fig. 5 is a vertical section illustrating the removal of the duplicate record-core and matrix from the hollow base. Fig. 6 is a longitudinal section of the duplicate record as removed from the core and matrix, and Fig. 7 is a longitudinal section of the completed duplicate record.

The matrix or body $a$ is prepared in any manner well known in the art. One end of the body is provided with a peripheral screw-thread.

$b$ represents the hollow core, preferably tapering and agreeing in dimensions with the mandrel of a phonograph or record-reproducing machine. One end of this hollow core is reduced and provided with a peripheral screw-thread. The head $c$ is provided with perforations 2 and with annular screw-surfaces 3 4, the hollow core $b$ screwing to the head at the screw-surface 4 and the matrix screwing to the head at the screw-surface 3. In this manner the matrix and the hollow core are connected together and maintained at a distance apart, the annular cavity between the same agreeing approximately with the finished duplicate record.

In the upper surface of the head $c$ I provide a ring $d$ with perforations, and the said ring $d$ is provided with a notched or cut-away portion for the swinging arm $e$, pivoted to the head and provided with a rounded end adjacent to the ring $d$ and bearing in a recess in said ring. In the normal position of the ring the head and the swinging arm $e$ in the position shown in Figs. 1 and 2, the perforations 2 in the head, and the perforations in the ring $d$ coincide; but when the arm $e$ is moved to turn the ring $d$ slightly the respective perforations are thrown out of alinement and the openings cut off.

I provide a hollow base $f$, adapted to receive closely within the same the matrix-body, and a guide-pin 7 (see especially Figs. 1 and 4) is inserted in a groove in the hollow base and bears in a groove in the matrix-body, so as to compel the matrix to move vertically in the hollow base. This hollow base is preferably put upon a pedestal $g$, having an opening in the center, and I provide a tube $i$, forming a center, a part of which passes through the opening in the hollow base $f$ into the opening in the pedestal and the other end of which extends upward into the opening in the hollow core $b$, and upon this tube $i$ is a disk 5, normally lying adjacent to the bottom of the hollow base.

$k$ represents the cap of a press, to which power can be applied.

$m$ represents a cam-arm slotted and adjustable and connected vertically upon one side of the hollow base by clamp-screws 6. The upper end of this arm is beveled to act as a cam against the end of the swinging arm $e$ as the matrix and hollow core are forced downward into the hollow base.

The under surface of the cap $k$ is preferably provided with annular and radial grooves 8.

I have shown in Fig. 1 by dark lines in the bottom of the hollow base a composition rendered fluid by heat. This may be effected either by heating the hollow base $f$ in any suitable manner or by pouring the material into the base sufficiently hot to enable the operations to be effected. After this material is put into the hollow base and with the perforations in the head $c$ and in the ring $d$ in line pressure is applied to the cap $k$ to force the matrix-body and the hollow core $d$ down into the base $f$. In this movement the air passes out of the perforations in the head and ring and escapes by the annular and radial grooves 8 in the cap $k$, and the composition in a fluid state rises between the matrix and the hollow core, fills the space therein, and some of the composition even escapes by the perforations in the head and ring. As these parts arrive at this position in the downward movement the cam $m$ strikes and swings the arm $e$, turning the ring $d$ and moving the perforations out of alinement and cutting off the composition, so that the same is held within the mold, and the further downward movement by pressure of the matrix and core consolidates the fluid composition material into a compact mass, compelling the same to fill all the fine interstices of the matrix. The parts are then allowed to stand until the composition is partially set, and water is then by preference passed through the tube $i$ to cool the hollow core $b$ and chill the composition material, cooling the same from the inside outward. When the composition has become sufficiently cooled, the pressure-cap having been removed, I then unscrew the head $c$ from the hollow core and matrix-body. This is readily accomplished, because the two screw-threads are cut in the same direction and the threads agree. Consequently when the head is rotated it comes away from the hollow core and matrix-body at the same time without disturbing the duplicate record. In unscrewing the head $c$ it becomes necessary to move the cam-arm $m$ out of the path of the swinging arm $e$; otherwise the cam-arm would interfere with the rotation of the head $c$. This is provided for by the slotted construction of the cam-arm and the set-screws, by which the same is held to the hollow base, these screws being loosened and the cam-arm dropped the length of the slot, which, it will be found, would move the same out of the path of the arm $e$ when the head is rotated. The hollow base, core, matrix, and composition, with the tube $i$, are moved away from the pedestal $g$ and turned upside down, with the end projecting into a ring $l$, resting upon a suitable base. Pressure is then applied to the upper end of the tube $i$ to force the same downward, and as the disk 5 is larger than the core and the duplicate record and of almost the diameter of the matrix-body the same is employed to press the hollow core, matrix, and duplicate record out of the hollow base $f$. When these parts have been separated from the hollow base, it will usually be found that the duplicate record has contracted with the cooling sufficiently to allow the hollow core $b$ to be readily removed from within the duplicate record and the record itself to be backed out of or removed from the matrix. One end of the duplicate record—that is, the end adjacent to the position of the head $c$—will be substantially in a finished condition. The flanges at the opposite end that in making the record came between the face of the disk 5 and the ends of the matrix and hollow core are readily removed by turning the same down in a lathe or in any other suitable manner.

I do not limit myself to the composition material rendered fluid by heat and employed for making the duplicate sound-record, but would remark that composition of a harder and tougher nature than the well-known waxy compositions can be readily employed for this purpose.

I claim as my invention—

1. The method herein specified of making duplicate sound-record cylinders consisting in forcing a composition material, rendered fluid by heat, into a matrix-mold and simultaneously permitting the air to escape after the composition enters, cutting off the escape when the mold is filled, then applying pressure to solidify and render dense the composition material in the mold, substantially as specified.

2. The method herein specified of making duplicate sound-record cylinders consisting in forcing a connected but spaced-apart matrix and hollow core down into a hollow base containing composition material rendered fluid by heat, forcing the same up into the annular recess between the matrix and the hollow core, permitting the air to escape therefrom as the composition advances, cutting off the air as the composition reaches the end of the annular recess and applying pressure to consolidate the composition and force the same into the interstices of the matrix, substantially as set forth.

3. The method herein specified of making duplicate sound-record cylinders, consisting in forcing a connected but spaced-apart matrix and hollow core down into a hollow base containing composition material rendered fluid by heat, forcing the same up into the annular recess between the matrix and the hollow core, permitting the air to escape therefrom as the composition advances, cutting off the air as the composition reaches the end of the annular recess and applying pressure to consolidate the composition and force the same into the interstices of the matrix, cooling the hollow core and the duplicate record from within outward, and thereafter separating the duplicate record from the matrix and the hollow core by forcing the same out of the hollow base and separating the same thereafter from the matrix and hollow core, substantially as set forth.

4. The method herein specified of forming duplicate sound-record cylinders, consisting in taking a matrix of a sound-record, connecting the same to a suitable support, taking a hollow core concentric to the matrix, connecting the same to the device supporting the matrix so that between the core and the matrix there is an annular recess representing the duplicate record, placing composition rendered fluid by heat in a suitable receptacle, forcing the matrix and hollow core down into the receptacle to cause the composition to flow up into the annular recess, permitting the air to escape as the composition advances, shutting off the escape of air or composition when the same reaches the end of the recess, applying further pressure to consolidate the composition and cause the same to fill all the interstices of the matrix, applying water to the inside of the core to cool the same and the matrix from within outward, removing the common support to the matrix and hollow core, turning the parts over upon a ring-like support, and applying pressure to force the core, matrix and duplicate record out of the base and thereafter separating the duplicate record as cooled, substantially as set forth.

Signed by me this 20th day of November, 1900.

ADEMOR N. PETIT.

Witnesses:
GEO. T. PINCKNEY,
S. T. HAVILAND.